(12) United States Patent
Veinotte et al.

(10) Patent No.: US 8,172,201 B2
(45) Date of Patent: May 8, 2012

(54) EXHAUST THROTTLING VALVE USING A GENERAL PURPOSE ACTUATOR

(75) Inventors: Andre Veinotte, Chester Basin (CA); David W. Balsdon, Chatham (CA); Russell Miles Modien, Chatham (CA)

(73) Assignee: Continental Tire Canada, Inc., Mississauga, Ontario (CA)

( * ) Notice: Subject to any disclaimer, the term of this patent is extended or adjusted under 35 U.S.C. 154(b) by 774 days.

(21) Appl. No.: 11/979,898

(22) Filed: Nov. 9, 2007

(65) Prior Publication Data
US 2008/0111091 A1    May 15, 2008

Related U.S. Application Data

(60) Provisional application No. 60/865,025, filed on Nov. 9, 2006.

(51) Int. Cl.
*F16K 51/00* (2006.01)
(52) U.S. Cl. ........ 251/285; 251/286; 251/288; 251/305; 123/337
(58) Field of Classification Search .............. 251/286, 251/288, 285, 305; 123/337
See application file for complete search history.

(56) References Cited

U.S. PATENT DOCUMENTS

| | | | | |
|---|---|---|---|---|
| 2,097,409 A | * | 10/1937 | Wertz | 137/601.13 |
| 2,414,947 A | * | 1/1947 | Heinze | 137/47 |
| 2,596,787 A | * | 5/1952 | Ottinger et al. | 137/329.04 |
| 2,672,156 A | * | 3/1954 | Lecarmure | 137/484 |
| 3,314,444 A | * | 4/1967 | White, Jr. | 137/377 |
| 3,429,556 A | * | 2/1969 | Kustwin Leo Frank | 251/285 |
| 4,527,771 A | * | 7/1985 | Yeary | 251/118 |
| 4,844,115 A | * | 7/1989 | Bowers | 137/240 |
| 4,860,706 A | * | 8/1989 | Suzuki et al. | 123/337 |
| 5,624,100 A | * | 4/1997 | Bolte et al. | 251/65 |
| 5,709,177 A | * | 1/1998 | Worth et al. | 123/65 PE |
| 5,979,871 A | * | 11/1999 | Forbes et al. | 251/305 |
| 5,979,872 A | * | 11/1999 | Stearns et al. | 251/305 |
| 6,164,623 A | * | 12/2000 | Ito et al. | 251/305 |
| 6,202,981 B1 | * | 3/2001 | Davis et al. | 251/143 |
| 6,267,352 B1 | * | 7/2001 | Semeyn et al. | 251/129.12 |
| 6,484,749 B1 | * | 11/2002 | Lim et al. | 137/375 |
| 7,121,259 B2 | * | 10/2006 | Wayama et al. | 123/399 |
| 7,264,221 B2 | * | 9/2007 | Yeary et al. | 251/127 |
| 2007/0063163 A1 | * | 3/2007 | Yeary et al. | 251/305 |

* cited by examiner

*Primary Examiner* — John Fristoe, Jr.
*Assistant Examiner* — Marina Tietjen

(57) ABSTRACT

An exhaust throttling valve (12) is provided for a vehicle. The valve includes a body structure (16, 41) having a bore (47) there-through. A shaft (28) is supported by the body structure for rotational movement. A valve member (34) is associated with the shaft such rotational movement of the shaft rotates the valve member. The valve member is disposed in the bore and is constructed and arranged to rotate between a first position substantially closing the bore and a second position at least partly opening the bore. A hard stop (56) is associated with the shaft so as to rotate therewith. First and second adjustment structures (52, 54) are constructed and arranged so that upon rotation of the shaft in one direction, the hard stop engages the first adjustment structure and upon rotation of the shaft in a direction opposite the one direction, the hard stop engages the second adjustment structure, thus limiting travel of the valve member.

16 Claims, 5 Drawing Sheets

EXHAUST THROTTLING VALVE USING A GENERAL PURPOSE ACTUATOR

This application claims the benefit of the earlier filing date of U.S. Provisional Application No. 60/865,025, filed on Nov. 9, 2006, which is hereby incorporated by reference into this specification.

FIELD OF THE INVENTION

This invention relates to an exhaust throttling valve (ETV) for a vehicle and, more particularly, to using a general purpose actuator (GPA) to actuate the EVT.

BACKGROUND OF THE INVENTION

The ETV is a device that creates a restriction in the exhaust pipe of a vehicle. The result of the increased exhaust flow restriction is increased exhaust gas recirculation (EGR) flow, and a reduction in the popping, e.g., tractor sound, created when an engine stops using some of its cylinders. The increased exhaust flow restriction is also seen as an increase in back pressure in the exhaust system, upstream of the ETV. The increased back pressure is what drives increased EGR flow. When a vehicle reduces the number of active, firing cylinders (e.g., Chrysler multi-displacement system (MDS) in the Hemi engine) and the vehicle is stationary and at idle, a person outside the vehicle will hear a sound like a diesel tractor. The advantage or incentive to use an ETV is that it increases the amount of time a vehicle can spend operating with fewer cylinders being active. At the present time, MDS is only used once the vehicle is moving, so people typically don't hear the tractor sound.

Conventional ETV systems used on higher end vehicles like the Corvette or Ferrari, have used a vacuum actuator for actuating the ETV. This type of system works well, but requires vacuum lines be run to the back of the vehicle, where the ETV system is typically located.

There is a need to provide an electrically actuated and cost-effective ETV, and to limit the travel of a valve member of the ETV.

SUMMARY OF THE INVENTION

An object of the invention is to fulfill the need referred to above. In accordance with the principles of the present invention, this objective is obtained by providing an exhaust throttling valve for a vehicle. The valve includes a body structure having a bore there-through. A shaft is supported by the body structure for rotational movement. A valve member is associated with the shaft such rotational movement of the shaft rotates the valve member. The valve member is disposed in the bore and is constructed and arranged to rotate between a first position substantially closing the bore and a second position at least partly opening the bore. A hard stop is associated with the shaft so as to rotate therewith. First and second adjustment structures are constructed and arranged so that upon rotation of the shaft in one direction, the hard stop engages the first adjustment structure and upon rotation of the shaft in a direction opposite the one direction, the hard stop engages the second adjustment structure, thus limiting travel of the valve member.

In accordance with another aspect of the invention, an exhaust throttling valve for a vehicle includes a body structure having a bore there-through. A shaft is supported by the body structure for rotational movement. Means, associated with the shaft for movement therewith, is provided for selectively obstructing the bore. The means for obstructing is constructed and arranged to rotate between a first position substantially closing the bore and a second position at least partly opening the bore. Means, associated with the shaft and mounted to rotate with the shaft, is provided for stopping rotational movement of the shaft. Means for limiting travel of the means for stopping is provided so that upon rotation of the shaft in one direction, the means for stopping engages a first portion of the means for limiting travel and upon rotation of the shaft in a direction opposite the one direction, the means for stopping engages a second portion of the means for limiting travel, thus limiting travel of the means for obstructing.

In accordance with yet another aspect of the invention, a method of limiting travel of an exhaust throttling valve is provided. The valve has a shaft supported by a body structure for rotational movement. The body structure has a bore there-through. The valve includes a valve member associated with the shaft and constructed and arranged to selectively obstruct the bore. The method associates a hard stop with the shaft so as to rotate therewith. First and second adjustment structures are provided so that upon rotation of the shaft in one direction, the hard stop engages the first adjustment structure and upon rotation of the shaft in a direction opposite the one direction, the hard stop engages the second adjustment structure, thus limiting travel of the valve member.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
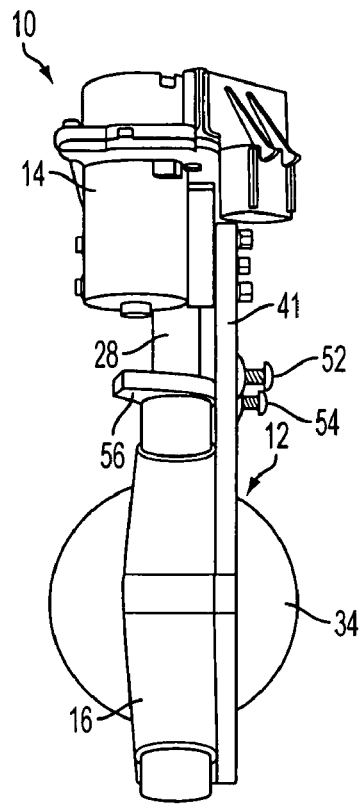
FIG. 1 is a side view of an EVT system having an EVT and an actuator in accordance with an embodiment of the present invention.

With reference to FIG. 1, an EVT system is shown generally indicated at 10, in accordance with the principles of an embodiment of the invention. The system 10 includes an EVT, generally indicated at 12, and a conventional, generally purpose electrically operated actuator 14 for actuating the EVT.

Figure 2:
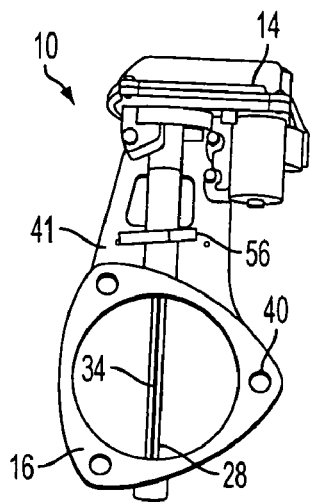
FIG. 2 is a front view of the EVT system of FIG. 1.
Figure 4:
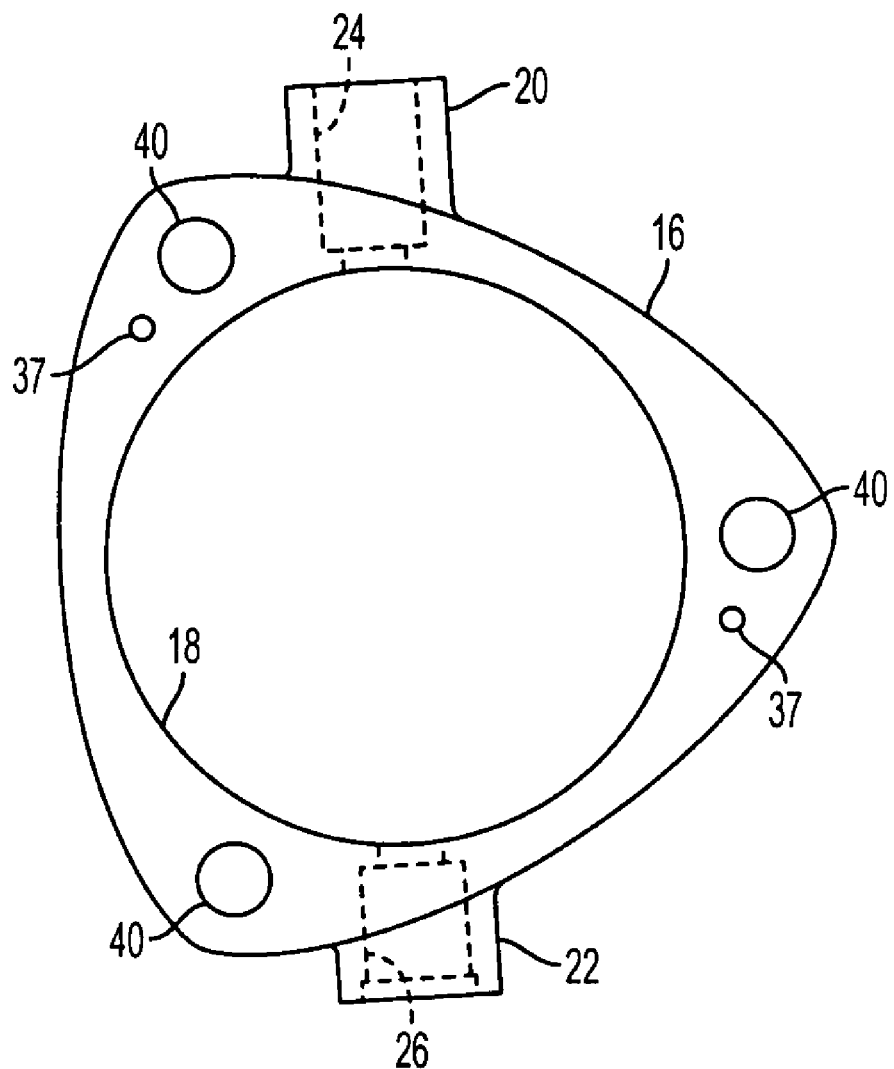
FIG. 4 is a view of the body of the EVT of the EVT system of FIG. 2
Figure 5:
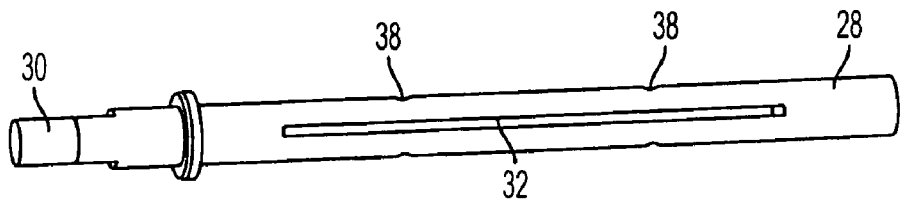
FIG. 5 is a view of the shaft of the EVT of the EVT system of FIG. 1.
Figure 6:
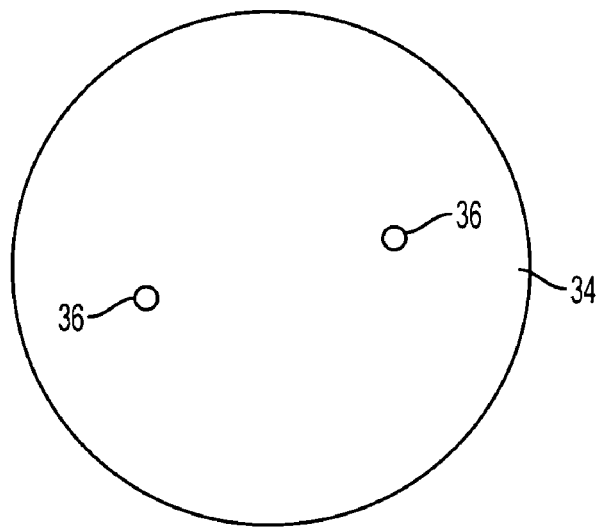
FIG. 6 is a view of the plate of the EVT of the EVT system of FIG. 1.
Figure 9:
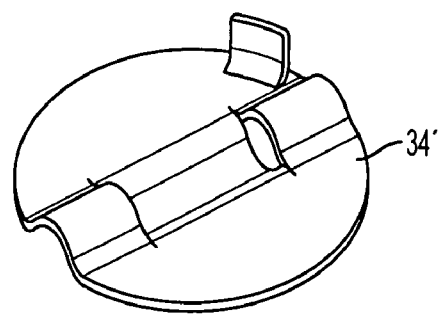
FIG. 9 is a view of another embodiment of the plate of the EVT of the EVT system.

As best shown in FIGS. 1, 2 and 4, the EVT includes a body 16 having a bore 18 there-through. The body 16 includes a first shaft supporting end 20 and an opposing second shaft supporting end 22. The ends 20 and 22 have axially aligned bores 24 and 26, respectively for receiving associated ends of a shaft 28 (FIG. 1) of the EVT 12 for rotational movement of the shaft 28. With reference to FIG. 5, the shaft includes an end 30 that is keyed or otherwise coupled with the actuator 14 so that the actuator 14 can cause rotation of the shaft 28. In the embodiment of FIG. 5, the shaft includes a slot 32 there-through for receiving a butterfly plate 34 (FIG. 6) that defines the valve member of the EVT. The plate 34 and the shaft include coopering holes 36, 38, respectively for coupling the plate 34 to the shaft 28 by screws or the like. Alternatively, as shown in FIG. 9, the plate 34' can be of the type that wraps around a shaft instead of being inserted into the slot 32 of the shaft of FIG. 5. This provides a safety measure if the plate 34 becomes unattached from the shaft 28 and allows the shaft to be solid (without slot 32), thus increasing strength and reducing machining on the shaft.

Figure 3:
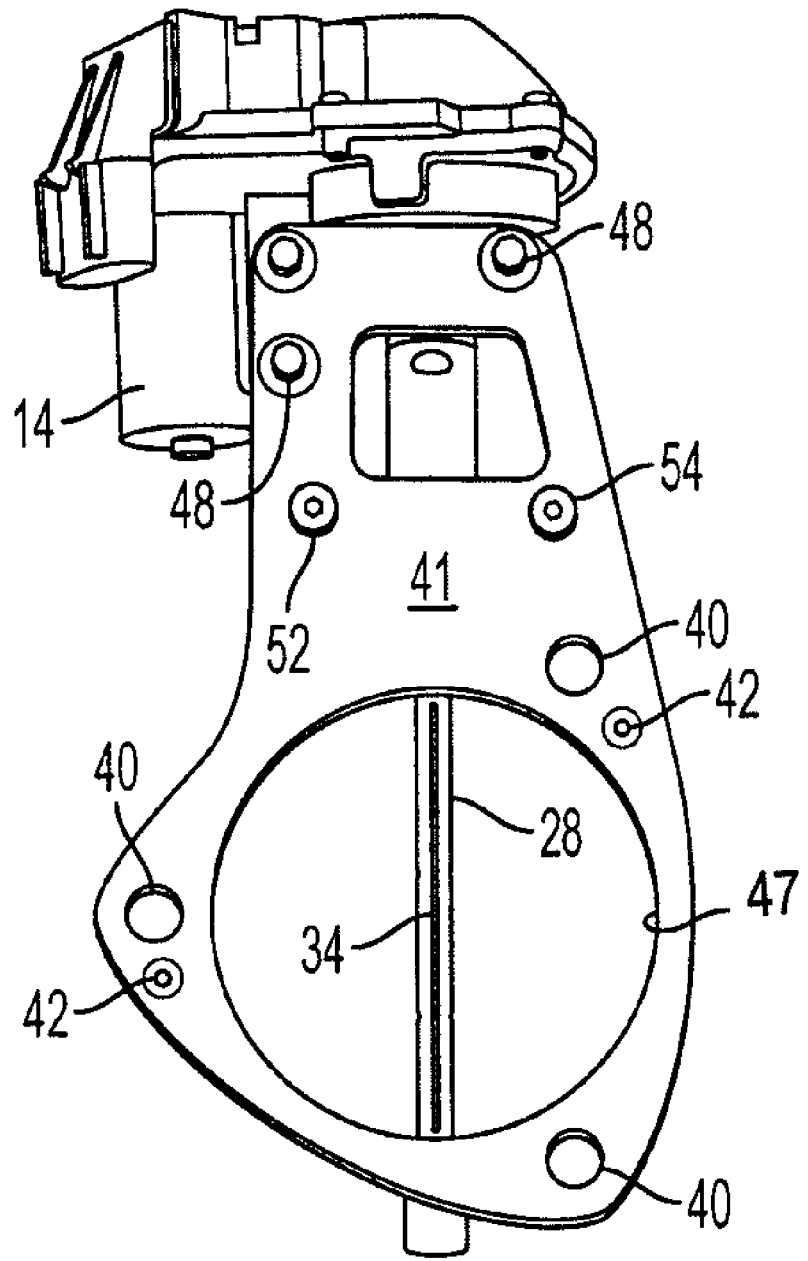
FIG. 3 is a rear view of the EVT system of FIG. 1.

With reference to FIG. 5, the body 16 includes at least a pair of bores 37 there-through that align with bores 39 in mounting structure 41 (FIG. 8) so that the body 16 can be secured to the mounting structure 41 by screws 42 (FIG. 3) bolts or other fasteners. In addition, the body 16 and the mounting structure 41 have cooperating bores 40 for mounting the mounting structure 41 together with the body 16 to an exhaust pipe of (not shown). Still further, the bore 18 of the body 16 cooperates with a bore 44 in the mounting structure 41 to define an EVT bore 47 (FIG. 3). The plate 34 is disposed in the bore 47 and can be rotated by the actuator 14 between a closed position wherein the plate 34 substantially closes the bore 47 and an open position wherein the plate 34 is positioned to at least partially open the bore 47 for exhaust gas to pass therethrough. The body 16 can be considered to be part of the mounting structure 41 thereby defining a body structure.

Figure 8:
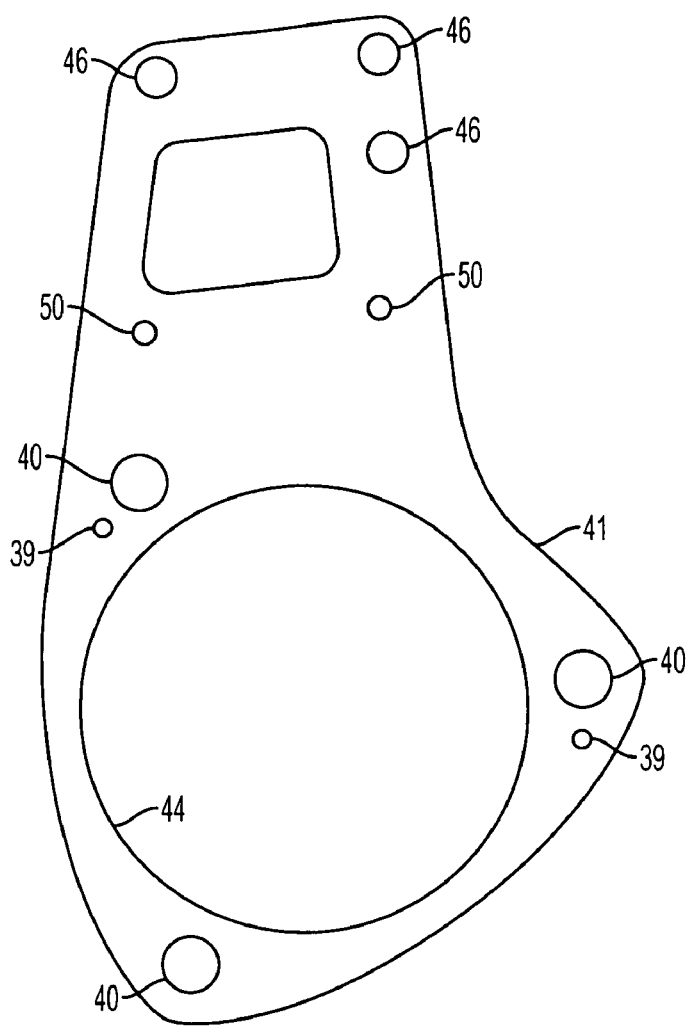
FIG. 8 is a view of the mounting structure of the EVT of the EVT system of FIG. 2.

With reference to FIG. 8, the mounting structure includes bores 46 for receiving screws 48 (FIG. 3), bolts, or other fastening structure to mount the actuator 14 to the mounting structure 41. In addition, the mounting structure 41 includes a pair of threaded bores 50 therein; each receiving an associated adjustment structure in the form of Allen screws 52 and 54 (FIGS. 1 and 3). Thus, the travel of the plate 34 can be adjusted, or limited, using the valve closed adjustment screw 52. Only the screw 52 that adjusts the closed position should be adjusted. The other screw 54 sets the open position of the plate 34, and moving this screw 54 will only limit, or over rotate the valve plate 34, and increase the valve open, flow restriction.

The ETV 12 is operated by the actuator 14 since it is easier and more cost-effective to wires run to the actuator 14 at the EVT 12 than to run vacuum lines as in conventional systems. The actuator 14 on the ETV 12 is programmed to run to a hard stop position. It has been taught a position, and cannot be re-taught that position without an outside, external PC connection.

In the embodiment, the actuator 14 requires a 12 to 14 volt power source, connected to the conventional four-wire wiring harness having red, black, yellow and green wires. The red wire is positive and the black wire is negative. The yellow wire is the control wire and must be taken high, or positive, or connected to the red wire, to activate the actuator 14 to close the plate 34. Removing the yellow wire from the high, or positive, or connection to the red wire, will return the plate 34 to the open position. The green wire is not required for operation of the actuator 14.

Figure 7:
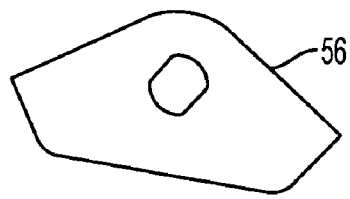
FIG. 7 is a view of position stop of the EVT of the EVT system of FIG. 1.

The actuator 14 of the embodiment is programmed to a 67 degree travel, with a soft stop travel of 15 degrees. By design, the plate 34 can only travel a maximum of 73 degrees. This travel is achieved by backing the adjustment screw 52 out all of the way, and allowing a rotational hard stop 56 (FIGS. 1 and 7), coupled to or associated with the shaft 28 to hit a backside of the mounting structure 41. The adjustment screw 52 can be adjusted to limit the travel to approximately 50 degrees. The soft stop portion of the actuator 14 travel is the region where the actuator is looking for the hard stop. If the adjustment screw 52 is turned to a point where the plate 34 cannot meet a minimum of 52 degrees, the actuator 14 will hit the hard stop 56, try four more times, and then return the plate 34 to a default position. If this happens, the actuator 14 must be reset by turning power off, and on again, and the travel obstruction corrected (52 degrees is approximately 0.5 turns of the screw 52 short of completely threaded into the mounting structure 41). FIG. 1 shows the ETV 12 in the open position, and against the adjustment screw 42. In the closed position, the plate 34 rotates 50 to 70 degrees, depending on the preset amount of flow blockage, and the hard stop 56 contacts the other adjustment screw 54.

It is possible to change the speed, either faster, or slower, of the actuator 14 and reduce the soft stop portion of the travel, as well as relearn a new hard stop position. The speed of the soft stop portion of travel can also be adjusted. The reduction of the soft stop portion of travel will reduce the amount of adjustment available. These changes require a re-flashing of the programmable attributes of the actuator.

Since the actuator 14 holds the plate 34 of the ETV 12 on fixed stops, noise, vibration and harshness (NVH) is reduced. With the EVT 12 held firmly against positive stops, the opportunity of parts to rattle, and make noise are significantly reduced. The position of these stops can be programmed into the actuator 14. The stops 52, 54 are external stops, advantageously on the outside of the part and out of the flow path and easily adjustable.

As can be seen in FIG. 1, the lower portion of the system 10 has a thin width. The system 10 is reduced to a very flat profile that only requires one set of bolts to mount to the exhaust pipe. The plate 34 of the valve is allowed to enter into the interior of the incoming and exiting pipes. In other words, the diameter of the circular plate 34 is substantially larger that the width of the EVT 12.

The stop mechanism can be used to aid heat dissipation. For example, the mounting structure 41 can be configured to act as a cooling fin to increase heat transfer. Furthermore, the mounting structure 41 can be used to provide protective shielding and air ducting for the actuator 16.

The shaft 28 can be positioned so that it is not centered in the bore of the exhaust pipe. This off-centered position can be used to take advantage of a non-balanced flap so that the flowing exhaust gas helps to hold the flap in position (either opened or partially closed). This will aid in NVH and may reduce the holding current required by the motor.

The plate 34 can be shaped so that the exhaust gas flow impinging thereon aids in keeping the plate 34 in its end stop position. This will aid in NVH and may reduce the holding current required by the electric motor of the actuator 14.

The EVT system 10 can be used to increase backpressure in an exhaust system with the ability to reduce the active cylinders of the vehicle during operation and to reduce the NVH during reduced cylinder operation.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An exhaust throttling valve for a vehicle comprising:
    a body structure having a an unobstructed bore therethrough,
    a shaft supported by the body structure for rotational movement,
    a valve member associated with the shaft such rotational movement of the shaft rotates the valve member, the valve member being disposed in the bore and being constructed and arranged to rotate between a first position substantially closing the bore and a second position at least partly opening the bore,
    a programmable, electrically operated actuator, the shaft being associated with the actuator so that the actuator can cause rotation of the shaft,
    a hard stop associated with the shaft so as to rotate therewith, and
    first and second adjustment structures constructed and arranged so that upon rotation of the shaft in one direction, the hard stop engages the first adjustment structure and upon rotation of the shaft in a direction opposite the one direction, the hard stop engages the second adjustment structure, thus limiting travel of the valve member,
    wherein the actuator constructed and arranged to be programmed to a certain degree of travel defined by a position of the first and second adjustment structures, and
    wherein the actuator is constructed and arranged to be programmed to define a soft stop portion of travel which is a region of travel where the hard stop is approaching one of the adjustment structures,
    wherein the valve member is a circular plate and a diameter of the plate is greater than the width of the body structure so that when the bore is substantially open, a portion of the circular plate extends beyond bounds of the body structure, and
    wherein the body structure comprises a body coupled to a separate mounting structure, the body and the mounting structure each having 1) cooperating mounting bores for mounting to an exhaust pipe and 2) a cooperating, unobstructed bore that together define the bore in the body structure, each mounting bore being disposed on an axis that is generally parallel with an axis of the bore of the body structure.

2. The system of claim 1, wherein each of the first and second adjustment structures and the hard stop are disposed outside of the bore.

3. The system of claim 2, wherein the hard stop is coupled to the shaft.

4. The system of claim 2, wherein each adjustment structure is an adjustment screw threadedly engaged with surfaces defining a threaded bore in the mounting structure.

5. The system of claim 4, wherein the adjustment screw is an Allen screw.

6. The system of claim 4, wherein the body supports the shaft.

7. The system of claim 1, wherein the shaft includes a slot therein, the valve member extending through the slot.

8. The system of claim 1, wherein the valve member is constructed and arranged to wrap around a portion of the shaft.

9. The system of claim 1, wherein the certain degree of travel is 67 degrees and the soft stop travel is programmed to 15 degrees.

10. An exhaust throttling valve for a vehicle comprising:
    a body structure having an unobstructed bore therethrough,
    a shaft supported by the body structure for rotational movement,
    means, associated with the shaft for movement therewith, for selectively obstructing the bore, the means for obstructing being constructed and arranged to rotate between a first position substantially closing the bore and a second position at least partly opening the bore,
    a programmable, electrically operated actuator, the shaft being associated with the actuator so that the actuator can cause rotation of the shaft,
    means, associated with the shaft and mounted to rotate with the shaft, for stopping rotational movement of the shaft, and
    means for limiting travel of the means for stopping so that upon rotation of the shaft in one direction, the means for stopping engages a first portion of the means for limiting travel and upon rotation of the shaft in a direction opposite the one direction, the means for stopping engages a second portion of the means for limiting travel, thus limiting travel of the means for obstructing,
    wherein the actuator constructed and arranged to be programmed to a certain degree of travel defined by a position of the first and second adjustment structures, and
    wherein the actuator is constructed and arranged to be programmed to define a soft stop portion of travel which is a region of travel where the hard stop is approaching one of the adjustment structures,
    wherein the means for obstructing is a circular plate and a diameter of the plate is greater than the width of the body structure so that when the bore is substantially open, a portion of the circular plate extends beyond bounds of the body structure, and
    wherein the body structure comprises a body coupled to a separate mounting structure, the body and the mounting structure each having 1) cooperating mounting bores for mounting to an exhaust pipe and 2) a cooperating, unobstructed bore that together define the bore in the body structure, each mounting bore being disposed on an axis that is generally parallel with an axis of the bore of the body structure.

11. The system of claim 10, wherein means for stopping is a hard stop is coupled to the shaft.

12. The system of claim 10, wherein the means for limiting travel is a pair of adjustment screws each threadedly engaged with surfaces defining a threaded bore in the mounting structure.

13. The system of claim 12, wherein the body supports the shaft.

14. The system of claim 10, wherein the shaft includes a slot therein and the means for obstructing is a circular plate extending through the slot.

15. The system of claim 10, wherein the means for obstructing is a plate constructed and arranged to wrap around a portion of the shaft.

16. The system of claim 10, wherein the certain degree of travel is 67 degrees and the soft stop travel is programmed to 15 degrees.

* * * * *